UNITED STATES PATENT OFFICE.

EDWARD KIRK, OF OSWEGO, NEW YORK.

TREATMENT OF CAUSTIC SODA.

SPECIFICATION forming part of Letters Patent No. 275,498, dated April 10, 1883.

Application filed September 11, 1882. (Specimens.)

*To all whom it may concern:*

Be it known that I, EDWARD KIRK, of Oswego, in the county of Oswego and State of New York, have invented certain new and useful Improvements in the Treatment of Caustic Soda; and I do hereby declare the following to be a full, clear, and exact description of the same, which will enable others skilled in the art to which the invention appertains, or with which it is most nearly connected, to practice the same.

Heretofore difficulty has been experienced in preserving caustic soda in a powdered state, owing to the tendency of its particles, when exposed to the atmosphere, to deliquesce and to combine and mass together; and it is the object of my present invention to overcome this tendency in as great a degree as is practicable.

My invention therefore consists in mixing with the powdered caustic soda a quantity of powdered sand or sandstone sufficient to protect the particles of powdered caustic soda from such contact with each other as will cause them to combine and mass together, and also sufficient to shield, in a measure, the particles of caustic soda from contact with the atmosphere. Caustic soda thus treated is applicable generally in the arts, and can be handled with greater facility than the ordinary commercial article.

Where it is to be used as a flux in the manufacture of cast-iron, I may take as low as one part of ground sand or sandstone to five parts of ground caustic soda; but the quantity of powdered sand or sandstone may be materially increased, though a less amount will not prove effective. While the powdered sand operates in a measure to protect the caustic soda from atmospheric influences, and from such contact of its particles as will permit them to mass together, there is no chemical combination between the sand and caustic soda which would cause it to solidify and harden, as would be the case were powdered limestone, for instance, used.

In practice the caustic soda and sand or sandstone are ground up to a powder, either separately or together, and intimately mixed.

From the facility with which the article prepared according to my invention can be handled, it is especially adapted for use as a flux in the manufacture of cast-iron, though for the same reason it also commends itself to the trade generally.

I claim as my invention—

The herein-described composition, consisting of powdered caustic soda and powdered sand or sandstone, combined in substantially the proportions set forth, for the purpose specified.

EDWARD KIRK.

Witnesses:
MELVILLE CHURCH,
FRED. F. CHURCH.